United States Patent [19]

Steigerwald

[11] Patent Number: 5,377,090
[45] Date of Patent: Dec. 27, 1994

[54] PULSED POWER CONVERTER WITH MULTIPLE OUTPUT VOLTAGES

[75] Inventor: Robert L. Steigerwald, Burnt Hills, N.Y.

[73] Assignee: Martin Marietta Corporation, Moorestown, N.J.

[21] Appl. No.: 5,952

[22] Filed: Jan. 19, 1993

[51] Int. Cl.$^5$ .................... H02M 3/335; G05F 1/44
[52] U.S. Cl. ........................ 363/20; 323/266; 307/18; 315/411; 348/730
[58] Field of Search ................... 363/20, 59, 131; 307/17, 18, 19, 20; 358/190; 315/411; 323/266, 267, 268, 350

[56] References Cited

U.S. PATENT DOCUMENTS

| | | | |
|---|---|---|---|
| 3,614,599 | 10/1971 | Gmuer | 323/44 |
| 3,660,672 | 5/1972 | Berger et al. | 307/17 |
| 3,742,242 | 6/1973 | Morio et al. | 307/17 |
| 4,355,884 | 10/1982 | Honda et al. | 355/14 CH |
| 4,538,101 | 8/1985 | Shimpo et al. | 323/272 |
| 4,788,634 | 11/1988 | Schlecht et al. | 363/21 |
| 4,829,216 | 5/1989 | Rodriguez-Cavazos | 315/411 |
| 5,013,980 | 5/1991 | Stephens et al. | 315/411 |

OTHER PUBLICATIONS

L. F. Casey and M. F. Schlecht, A High–Frequency, Low Volume, Point–of–Load Power Supply For Distributed Power Systems, Laboratory for Electromagnetic and Electronic Systems, Massachusetts Institute of Technology, 1987, pp. 439–450.
Steigerwald, "High–Bandwidth Point–of–Load Power Supply," pending U.S. patent application, Ser. No. 07/811,631, filed Dec. 23, 1991.
Steigerwald et al., "High–Density Distributed Power System Employing Capacitance–Multiplying Converters For Supplying Pulsed Loads," Ser. No. 07/802,102, filed Dec. 4, 1991.

*Primary Examiner*—Steven L. Stephan
*Assistant Examiner*—Adolf Berhane
*Attorney, Agent, or Firm*—J. M. Breedlove; W. H. Meise; C. A. Nieves

[57] ABSTRACT

A distributed power system for providing multiple output voltages, including pulsed voltages, to a solid-state phased-array radar transmit/receive module, for example, includes: an energy-storage capacitor for coupling to an input dc power source and for storing substantial energy at high voltage for supplying pulsed voltages at low voltage; at least one capacitance-multiplying converter, including first and second transformers with multiple secondary windings, for producing positive and negative voltages on buses internal to a power module; and a plurality of series regulators to obtain multiple positive and negative load voltages, including pulsed voltages, from the positive and negative bus voltages. Substantial energy storage is achieved within the power module; and, if even more energy storage is desired, an additional external energy-storage capacitor can be coupled to the input power leads, thereby being coupled in parallel with the energy-storage capacitor. Only two power pins are needed to supply the entire module.

2 Claims, 1 Drawing Sheet

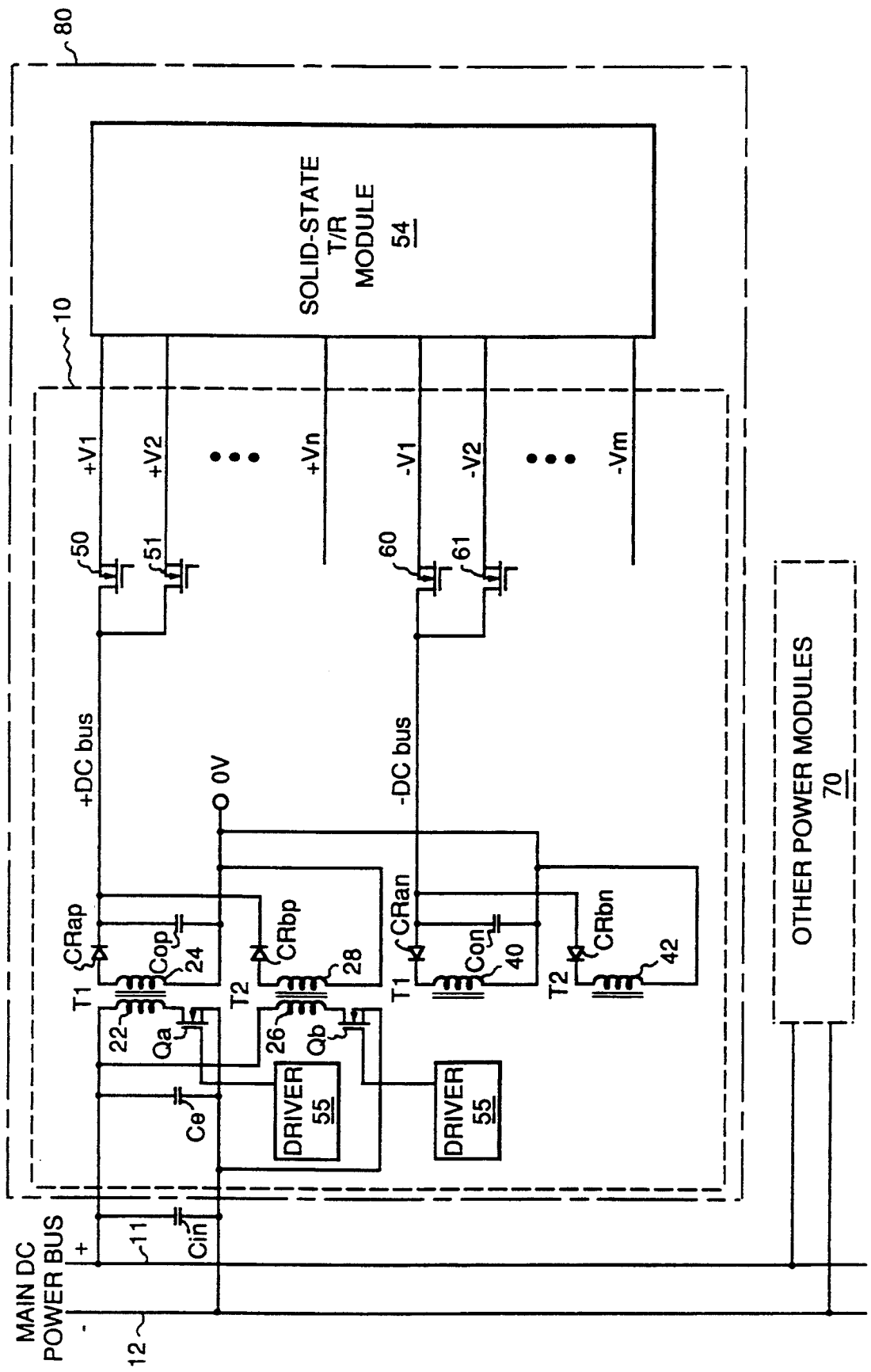

PULSED POWER CONVERTER WITH MULTIPLE OUTPUT VOLTAGES

RELATED APPLICATIONS

This application is related to commonly assigned U.S. Pat. No. 5,274,539 of R. L. Steigerwald and R. A. Fisher, issued Dec. 28, 1993, and to commonly assigned abandoned U.S. patent application Ser. No. 811,631 of R. L. Steigerwald, filed Dec. 23, 1991, both of which are incorporated by reference herein.

FIELD OF THE INVENTION

The present invention relates generally to power converters and, more particularly, to power converters for supplying distributed pulsed loads such as, for example, in radar applications.

BACKGROUND OF THE INVENTION

Several well-regulated voltages are necessary to support a solid-state phased-array radar transmit/receive (T/R) module, which typically contains radio frequency (RF) amplifiers and controls. In particular, these voltages include at least one pulsed voltage and several low utilization voltages. Normally, the low utilization voltages are brought into the T/R module via separate lines. Energy storage for the pulsed line is external to the T/R module and is furthermore at a low utilization voltage, resulting in the need for relatively large high-energy-storage capacitors. Moreover, typical T/R modules have many module pins and hence complicated configurations.

Accordingly, it is desirable to provide a distributed power system for providing multiple output voltages, including pulsed voltages, in a small volume. Furthermore, it is desirable to provide such a distributed power system requiring only two leads to each power module.

SUMMARY OF THE INVENTION

A distributed power system for providing multiple output voltages, including pulsed voltages, to a solid-state phased-array radar T/R module, for example, comprises: an energy-storage capacitor for coupling to an input dc power source and for storing substantial energy at high voltage for supplying pulsed voltages at low voltage; at least one capacitance-multiplying converter, including first and second transformers with multiple secondary windings, for producing positive and negative voltages on buses internal to a power module; and a plurality of series regulators to obtain multiple positive and negative load voltages, including pulsed voltages, from the positive and negative bus voltages. Advantageously, substantial energy storage is achieved within the power module; and, if even more energy storage is desired, an additional external energy-storage capacitor can be coupled to the input power leads, thereby being coupled in parallel with the energy-storage capacitor. Only two power pins are needed to supply the entire module.

BRIEF DESCRIPTION OF THE DRAWINGS

The features and advantages of the present invention will become apparent from the following detailed description of the invention when read with the accompanying drawings in which:

FIG. 1 is a schematic illustration of a multiple-output pulse power supply in accordance with the present invention suitable for use in radar applications.

DETAILED DESCRIPTION OF THE INVENTION

FIG. 1 schematically illustrates a multiple-output pulsed power supply according to the present invention. By way of illustration, the multiple-output pulsed power supply of FIG. 1 is shown as being employed in a radar application; however, it is to be understood that the power supply is suitable for any application having distributed pulsed loads.

As shown in FIG. 1, power is provided to a power module 10 via power buses 11 and 12. The power module includes a capacitance-multiplying converter 20 which comprises a series combination of a first switching device Qa and a primary winding 22 of a first transformer T1 coupled in parallel with an energy-storage capacitor Ce. A secondary winding 24 of transformer T1 is coupled in parallel, via a diode rectifier CRap, to a small high-frequency output filter capacitor Cop. Capacitance-multiplying converter 20 further includes a series combination of a second switching device Qb and a primary winding 26 of a second transformer T2 also coupled in parallel with energy-storage capacitor Ce. Switching devices Qa and Qb are illustrated as FET's; however, any suitable types of switching devices may be used. A secondary winding 28 of transformer T2 is coupled in parallel, via a diode rectifier CRbp, to output filter capacitor Cop. Transformers T1 and T2 have substantially the same turns ratio N.

Capacitance-multiplying converter 20 is also illustrated as including additional secondary windings 40 and 42 of transformers T1 and T2, respectively. Additional secondary windings 40 and 42 are coupled via diode rectifiers CRan and CRbn, respectively, to an output filter capacitor Con and the negative dc bus voltage.

Output voltages $+V1, +V2, \ldots$ are obtained from the positive dc bus voltage via series regulators 50, 51 . . . , respectively, to a solid-state phased-array radar T/R module 54. Output voltages $-V1, -V2, \ldots -Vm$ are obtained from the negative dc bus voltage via series regulators 60 and 61 . . . , respectively, to solid-state radar T/R module 54. For an exemplary T/R module, $+V1$ is a pulsed voltage, and the remaining output voltages $+V2 \ldots +Vn$ and $-V2 \ldots -Vm$ are bias voltages used for control and receive functions. In operation, switching devices Qa and Qb are gated 180° out-of-phase with a 50% duty cycle by drive means 55. Hence, because one of the switching devices is always conducting, the energy-storage capacitor Ce is always transformer-coupled to the positive and negative dc output buses.

The output filter capacitors Cop and Con are used for filtering switching noise and hence are not required to store substantial energy. The output filter capacitors are thus relatively small as compared with energy-storage capacitor Ce. Therefore, through transformer action, the effective output capacitance Ceo is represented by:

$$C_{eo} = N^2 C_e,$$

where N is the transformer turns ratio. For example, a turns ratio of 10:1 would give a 100 times capacitance multiplication.

As indicated in FIG. 1, other power modules, represented collectively in block 70, such as module 10, may be coupled to dc power buses 11 and 12 and operate in the same manner as module 10.

Advantageously, in the power module configuration of FIG. 1, the energy storage capacitor is connected across the input power lines to the capacitance-multiplying converter such that, if additional energy storage is needed, another energy-storage capacitor (shown as capacitor Cin in FIG. 1) can be connected directly across the input lines to converter 20, the additional energy-storage capacitor Cin thus being coupled in parallel with energy-storage capacitor Ce. Hence, no additional power pins are needed to add energy storage capability to the converter.

As an additional advantage, the low multiple utilization voltages required in a radar T/R module are generated while requiring only two power module input pins.

As yet another advantage, pulse energy is stored in a high-voltage capacitor rather than at the substantially lower utilization voltages, thereby minimizing capacitor volume, allowing substantial energy storage to be in the module itself. Moreover, the number of magnetic components is minimized, and operation at high frequencies is possible, thereby reducing module size. As a result, the entire power supply can be embedded in the T/R module with the load, as indicated by dashed line 80, with only two power leads into module 80 being required.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A phased-array apparatus including plural TR modules, each TR module including at least an RF amplifier and controls, said apparatus comprising:

a two-conductor DC power bus carrying power at a particular voltage;

a plurality of power supply assemblages, each comprising a power module and an associated TR module;

each said TR module including at least first and second power input ports, and requiring for operation of said amplifier and controls at least first and second regulated voltages, respectively, at said first and second power input ports, and pulse loading at least said first regulated voltage;

each said power supply including:

(a) an energy storage capacitor including first and second electrodes, each of which is coupled to a different one of said two conductors of said DC power bus by a path lacking inductors;

(b) a first transformer with primary and secondary windings, the number of turns of said secondary winding of said first transformer being less than the number of turns of said primary winding of said first transformer by a predetermined ratio;

(c) a second transformer with primary and secondary windings, the number of turns of said secondary winding of said second transformer being less than the number of turns of said primary winding of said second transformer by said predetermined ratio;

(d) first controllable switching means coupled, by a path lacking inductors, to at least one of said first and second electrodes of said energy storage capacitor and to said primary winding of said first transformer, for controllably coupling said primary winding of said first transformer across said energy storage capacitor during those intervals in which said first switching means is in a first state, and for controllably decoupling said primary winding of said first transformer from said energy storage capacitor during those intervals in which said first controllable switching means is in a second state;

(e) second controllable switching means coupled, by a path lacking inductors, to at least one of said first and second electrodes of said energy storage capacitor and to said primary winding of said second transformer, for controllably coupling said primary winding of said second transformer across said energy storage capacitor during those intervals in which said second switching means is in said first state, and for controllably decoupling said primary winding of said second transformer from said energy storage capacitor during those intervals in which said second controllable switching means is in said second state;

(f) switch drive means coupled to said first and second switching means, for gating said first and second switching means mutually out-of-phase and with a 50% duty cycle;

(g) noise filtering capacitance means;

(h) first rectifying means coupled to said secondary winding of said first transformer and to said noise filtering capacitance means by a path lacking inductors, and poled for aiding in producing a first unregulated DC voltage across said noise filtering capacitance means during those intervals in which said primary winding of said first transformer is coupled across said energy storage capacitor by said first switching means in said first state;

(i) second rectifying means coupled to said secondary winding of said second transformer and to said noise filtering capacitance means by a path lacking inductors, and poled for aiding in producing said first unregulated DC voltage across said noise filtering capacitance means during those intervals in which said primary winding of said second transformer is coupled across said energy storage capacitor by said second switching means in said first state;

(j) first series voltage regulation means coupled to said noise suppressing capacitance means and to said first power input port of said TR module by a path lacking inductors, for generating said first regulated voltage at said first power input port of said TR module;

(k) second series voltage regulation means coupled to said noise suppressing capacitance means and to said second power input port of said TR module by a path lacking inductors, for generating said second regulated voltage at said second power input port of said TR module;

(l) whereby said first and second transformers are alternately coupled to said energy storage capacitor by said first and second switching means and said noise filtering capacitance means is continuously coupled by a capacitance multiplying turns ratio of one of said first and second transformers to said energy storage capacitor, and said pulse load of said TR module is supplied by said energy storage capacitor by way of that one of said first and second transformers currently coupled between said energy storage capacitor and said noise filtering capacitance means.

2. An apparatus according to claim 1, wherein:

each said TR module includes at least third and fourth power input ports, and requires for its operation at least third and fourth regulated voltages, respectively, at said first and second power input ports, which third and fourth regulated voltages are poled oppositely to said first regulated voltage; and each of said first and second transformers includes a further secondary winding, and further comprising:

second noise filtering capacitance means;

third rectifying means coupled to said further secondary winding of said first transformer and to said second noise filtering capacitance means by a path lacking inductors, and poled for aiding in producing a second unregulated DC voltage, opposite to said first unregulated DC voltage, across said second noise filtering capacitance means during those intervals in which said primary winding of said first transformer is coupled across said energy storage capacitor by said first switching means in said first state;

fourth rectifying means coupled to said further secondary winding of said second transformer and to said second noise filtering capacitance means by a path lacking inductors, and poled for aiding in producing said second unregulated DC voltage across said second noise filtering capacitance means during those intervals in which said primary winding of said second transformer is coupled across said energy storage capacitor by said second switching means in said first state;

third series regulation means coupled to said second noise suppressing capacitance means and to said third power input port of said TR module by a path lacking inductors, for generating said third regulated voltage at said third power input port of said TR module;

fourth series regulation means coupled to said second noise suppressing capacitance means and to said fourth power input port of said TR module by a path lacking inductors, for generating said fourth regulated voltage at said fourth power input port of said TR module, whereby said four regulated voltages are applied to said TR module while drawing power from said two-conductor DC power bus only by way of said coupling of said energy storage capacitor electrodes coupled to said conductors of said DC power bus.

* * * * *